Figure 6:
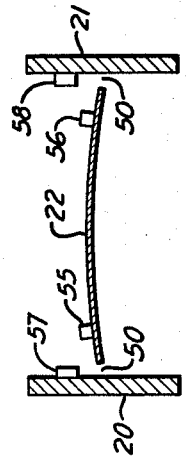

Aug. 11, 1964    L. E. ANDERSON, SR    3,144,543
FABRICATION OF STRUCTURAL MEMBERS
Filed Aug. 21, 1962    3 Sheets-Sheet 1
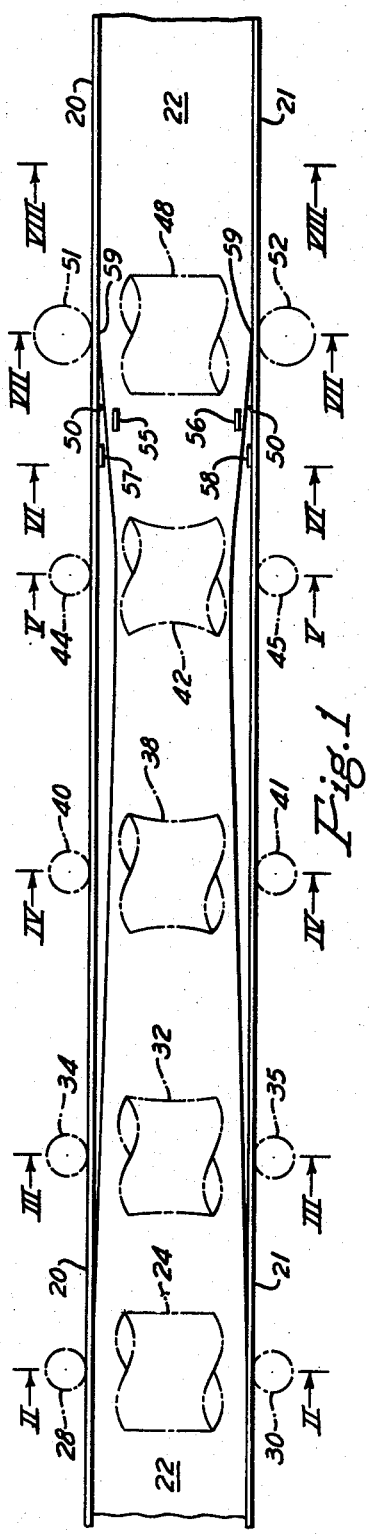
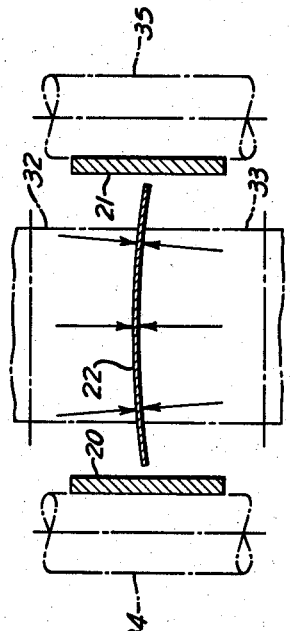
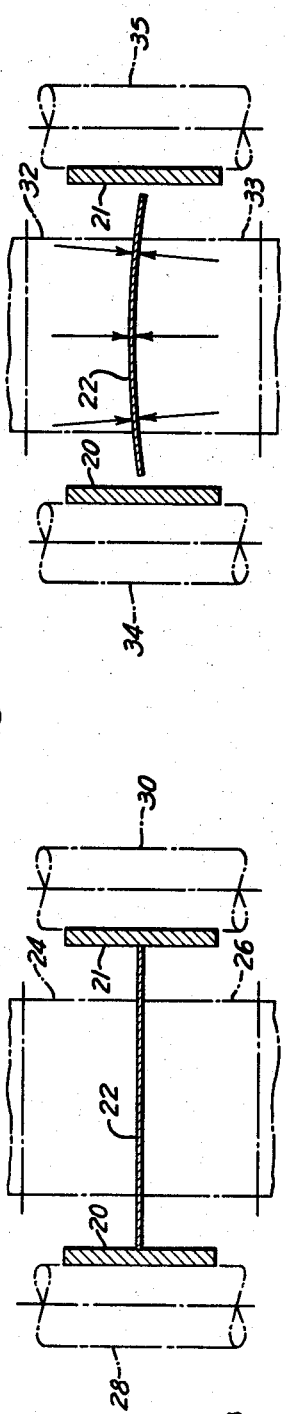
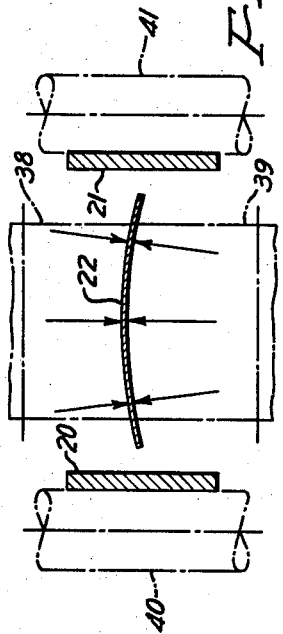
INVENTOR.
LLOYD E. ANDERSON, SR.
BY
Brown, Critchlow, Flick & Peckham.
ATTORNEYS.

Aug. 11, 1964 L. E. ANDERSON, SR 3,144,543
FABRICATION OF STRUCTURAL MEMBERS
Filed Aug. 21, 1962 3 Sheets-Sheet 2

INVENTOR.
LLOYD E. ANDERSON, SR.
BY
Brown, Critchlow, Flick & Peckham.
ATTORNEYS Aug. 11, 1964 L. E. ANDERSON, SR 3,144,543
FABRICATION OF STRUCTURAL MEMBERS
Filed Aug. 21, 1962 3 Sheets-Sheet 3
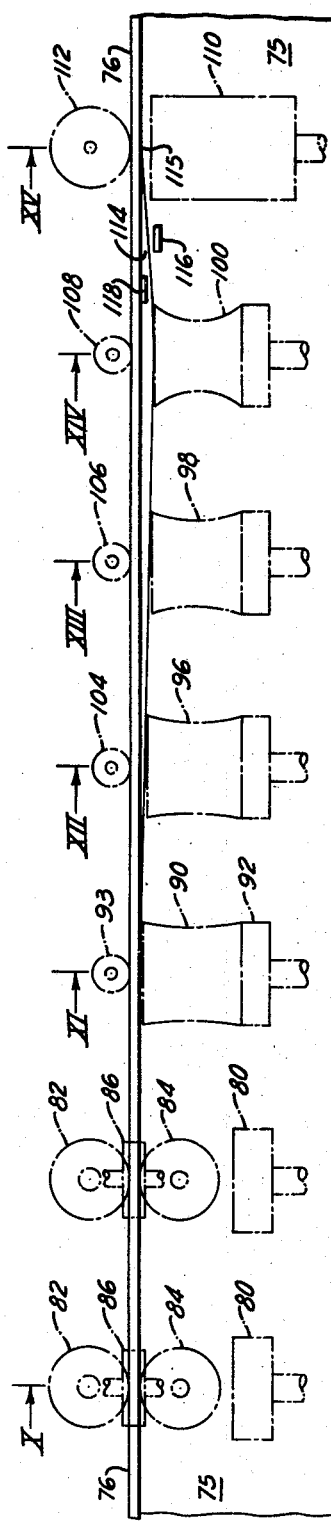
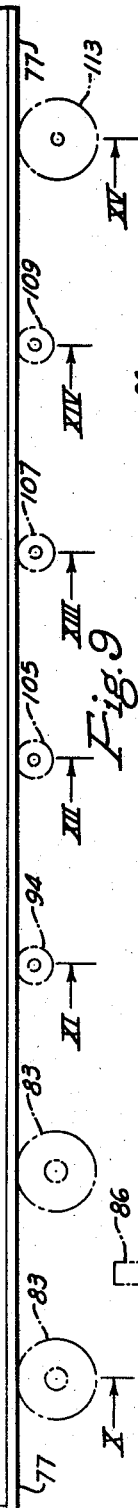
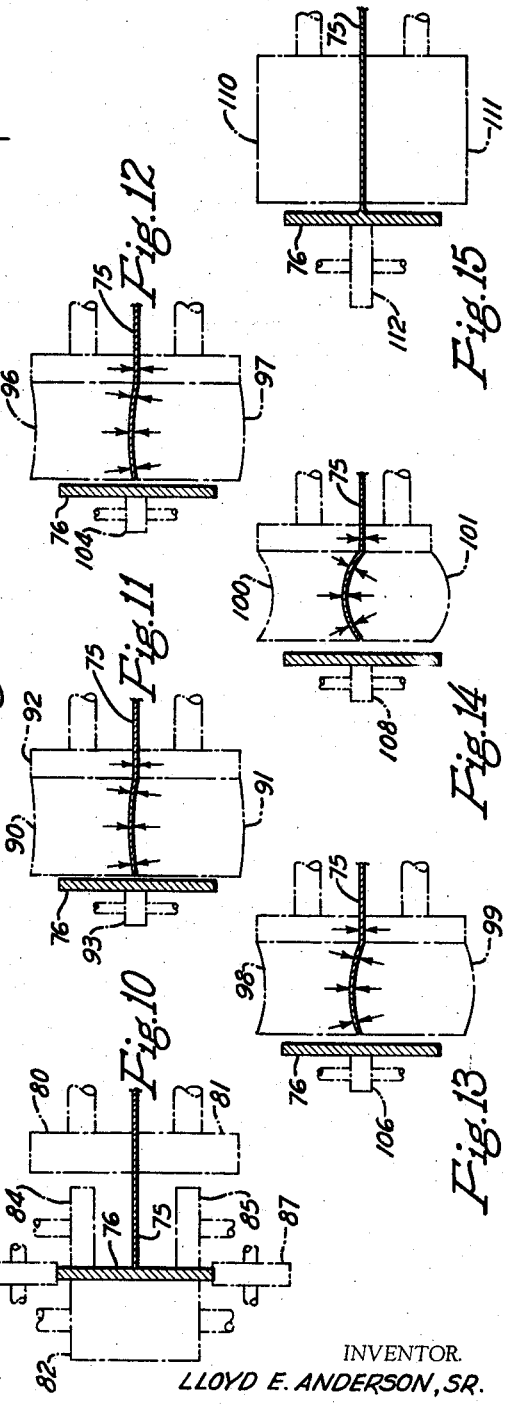
INVENTOR.
LLOYD E. ANDERSON, SR.
BY
Brown, Critchlow, Flick & Peckham.
ATTORNEYS.

United States Patent Office 3,144,543
Patented Aug. 11, 1964

3,144,543
FABRICATION OF STRUCTURAL MEMBERS
Lloyd E. Anderson, Sr., Pittsburgh, Pa., assignor to Pittsburgh-Des Moines Steel Company, Pittsburgh, Pa., a corporation of Pennsylvania
Filed Aug. 21, 1962, Ser. No. 218,371
7 Claims. (Cl. 219—102)

This invention relates to, and has among its principal objects the provision of, a method and apparatus for fabricating large size structural members from metal plates and strip by means of high frequency resistance welding techniques. The invention is particularly applicable to the fabrication of large size structural members, such as I-beams and the like, having heavy thick flanges joined by a web of lesser thickness.

The application of high frequency resistance welding to the fabrication of structural and tubular shapes is well known. Fundamentally, it involves bringing high frequency current through contact elements into the materials to be joined so as to cause only the actual weld surfaces to be heated, then pressing those surfaces together to produce a forged type weld. In this type of welding, the members are pressed together from an open state, thereby requiring a small open triangle or V with the weld point as its apex and the actual surfaces to be joined as its sides. This triangle may vary in size according to the material being welded, its configuration, and its thickness. High frequency current is introduced by means of a pair of contacts on the sides of the V and just ahead of its apex. Following the path of lowest inductance, the current flows along the sides of the V and heats them between the tips of the contacts and the weld point, the heating being largely confined to the surfaces to be joined. As a result, the metal ahead of the weld point is preheated to welding temperature, and the pressure applied at the weld point partially upsets the metal and bonds the two members together to produce an excellent type of forged weld. To obtain the V-opening just ahead of the weld point requires that the two surfaces to be welded (forming the sides of the V) must approach each other at an angle. This is comparatively easy to do with light materials. For example, I-beams have been fabricated by high frequency resistance welding in which the flange members are bent as they are fed towards the web member to provide V-openings between web and flanges. However, for large I-beams and like structural shapes, in which the flanges may be on the order of an inch or more thick and relatively wide, it is impracticable to attempt to bend them as they approach the web member to provide the necessary V-opening for high frequency resistance welding.

The present invention is predicated on the discovery that this V-opening can be obtained, without bending of the flange members, by transversely deforming and then straightening the web member, which is generally much thinner than the flanges. Such transverse deformation may be angular or curved, in either case being effective to reduce the width of the web just ahead of the weld point. For example, in fabricating an I-beam, the two flanges and the web may be initially aligned in their final configuration, then advanced with the flanges remaining essentially parallel while the web is progressively deformed in at least part of its transverse section as it advances until each side edge of the web becomes spaced by the desired amount from its adjacent flange, and then the web is completely flattened, so that each side edge contacts its adjacent flange. In this way, V-spaces or openings are defined between the web edges and the flanges, with the apex of each V-opening at the point of flattening of the web against the flanges. High frequency resistance welding may then proceed by applying the current contacts to the weld surfaces of the members ahead of the weld point.

Figure 8:
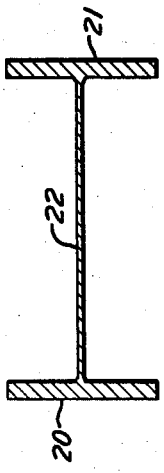
Figure 5:
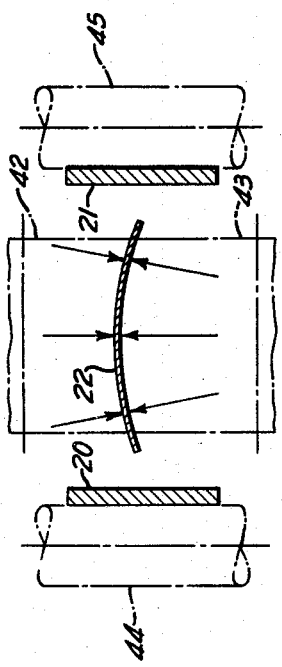
Figure 7:
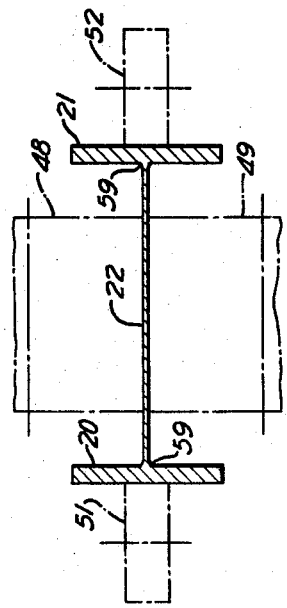

The invention will be most readily understood upon considering its detailed description in conjunction with the attached drawings, in which:

FIG. 1 is a schematic view of one form of the invention, in which two flanges and a web are being simultaneously fabricated into an I-beam;
FIG. 2 is a view taken along line II—II of FIG. 1;
FIG. 3 is a view taken along line III—III of FIG. 1;
FIG. 4 is a view taken along line IV—IV of FIG. 1;
FIG. 5 is a view taken along line V—V of FIG. 1;
FIG. 6 is a view taken along line VI—VI of FIG. 1;
FIG. 7 is a view taken along line VII—VII of FIG. 1;
FIG. 8 is a view taken along line VIII—VIII of FIG. 1 and is a cross-sectional view of the completed I-beam fabricated by this invention;
FIG. 9 is a schematic view of another form of the invention, in which the two flanges are separately welded to a web to form an I-beam;
FIG. 10 is a view taken along line X—X of FIG. 9;
FIG. 11 is a view taken along line XI—XI of FIG. 9;
FIG. 12 is a view taken along line XII—XII of FIG. 9;
FIG. 13 is a view taken along line XIII—XIII of FIG. 9;
FIG. 14 is a view taken along line XIV—XIV of FIG. 9; and
FIG. 15 is a view taken along line XV—XV of FIG. 9.

Referring to FIGURES 1 to 8 as a group, the numerals 20, 21 and 22 represent, respectively, the two flanges and the web of an I beam. In practicing the invention, flanges 20 and 21 and web 22 are initially aligned in contact with each other in the desired final configuration and are fed to apparatus designed to maintain that configuration, at least at its receiving end (shown at the left end of FIG. 1). For this purpose web 22 is fed between and is supported by a first pair of opposed, constant diameter rolls 24 and 26 (see FIGS. 1 and 2). Simultaneously, flanges 20 and 21 are fed, at the same rate of speed, in contact with the lateral edges of web 22, between a first pair of constant diameter squeeze rolls 28 and 30, which are located laterally of rolls 24 and 26. These squeeze rolls bear on the external sides of flanges 20 and 21 to provide the desired forward movement of the flanges, as well as providing some vertical support therefor. While not shown, it may be desirable, in addition, to use supporting rolls under the bottom edges of the flanges, in a manner similar to that described later in connection with FIG. 13. Such rolls can also be used to impart, or help to impart, the necessary forward motion to the flanges.

After the web passes through supporting rolls 24 and 26, it enters between the opposed curved surfaces of mating rolls 32 and 33 (see FIGS. 1 and 3). In the apparatus shown, the top roll 32 has a concave surface while the bottom roll 33 is provided with a conforming convex surface. Accordingly, web 22, as it passes through these rolls, is curved along its transverse section, thereby effectively decreasing its width. Vertical rolls 34 and 35 engaging the outer surfaces of flanges 20 and 21, at this location, act merely as guide rolls for those flanges, which move in a straight line.

The web then passes through the next set of horizontal rolls 38 and 39 (see FIGS. 1 and 4). Top roll 38 has a surface of greater concave curvature than the preceding top roll 32, while bottom roll 39 has a conforming convex surface. The transverse curvature of web 22 is increased as the web passes between rolls 38 and 39, thereby further decreasing the effective width of the web relative to its initial width in the flat condition. Laterally of rolls 38 and 39 are vertical guide rolls 40 and 41 to engage the outer surfaces of flanges 20 and 21, respectively, and keep them straight.

Still further transverse curvature and effective width reduction are imparted to web 22 by the next stand of concave and convex rolls 42 and 43, while the flanges are further guided in a straight line by vertical rolls 44 and 45 (see FIGS. 1 and 5). For purposes of description, the three stands of web deforming rolls herein described are considered adequate to curve the web transversely to the necessary extent. It will be understood, however, that the actual number of stands used will be determined by the thickness and composition of the web and by other criteria that form no part of this invention.

After the web 22 emerges form the last set of concave-convex rolls that serve to decrease its width to the desired minimum, it is fed between a pair of constant diameter horizontal rolls 48 and 49, which completely flatten it to its original width. The web tends to be partially flattened in advance of those rolls, so that the spacing of the edges of the web from the adjacent straight parallel flanges progressively decreases from a maximum at about the vertical plane defined by the axes of rolls 42 and 43 to a minimum (zero) at about the vertical plane defined by the axes of rolls 48 and 49. The result, as shown in FIG. 1, is that a V (indicated by the numeral 50) is defined between each edge of the web and its adjacent flange, as those members approach the flattening rolls, and the apices of the V-openings are close to or touch the plane defined by the axes of those rolls. Generally, the V-opening formed between the flange and the adjacent edge of the web is desirably about $3/16$ to $1/4$ inch wide at a distance of 3 inches from the apex of the V, defining an included angle of from 5° to 7° at the apex of the V; but these dimensions of the V will vary with the composition and thickness of the material being welded and with other factors. Laterally spaced from rolls 48 and 49 are forging squeeze rolls 51 and 52 that urgingly bear on the outside surfaces of flanges 20 and 21, to bring those flanges tightly against the edges of the flattened web.

A short distance in advance of flattening rolls 48 and 49 are a plurality of electrical contacts for bringing current into the members to be welded (see FIGS. 1 and 6). Two of these contacts, 55 and 56, are supported to make sliding contact with the surface of the web adjacent its edges about 3 inches in front of the apex of the V-opening 50. Two other contacts, 57 and 58, slidingly engage the surface of the flanges adjacent the sides of the V-openings and about 6 or 7 inches forward of the weld point 59. The location of the electrical contacts on web and flanges will depend on the thickness of those members and on other factors that are not here relevant. Generally, however, the contacts engaging the flanges will be ahead of those engaging the web, so as to apply more heat to the heavier flanges. These contacts serve as terminals for leads from conventional high frequency welding apparatus (not shown), by which current is fed through the web and flanges in the zones defining the V-openings to raise the local surface temperature of those members sufficiently to cause welding, preferably accompanied by some upsetting, when the side edges of the web and the inner faces of the flanges are brought together by flattening rolls 48 and 49 and by squeeze rolls 51 and 52. In this remarkably simple fashion, structural members are readily and rapidly fabricated with maximum economy of metal, labor, and other costs, without in any manner sacrificing desired design considerations.

In order to achieve maximum economy in welding, it is essential to use high frequency current to heat the parts to welding temperatures. The details of the equipment used, as well as the manner and theory of use, in high frequency welding form no part of the invention, and such information is readily available in various equipment company brochures, and also in the technical literature, as, for example, the article by W. C. Rudd in the July 1957 issue of The Welding Journal. Such welding requires that the surfaces to be welded be brought together in a V shaped configuration, with welding occurring at the apex of the V; and it is to the problem of attaining such configuration that this invention and the description herein is directed.

Where the web is exceptionally wide, it will often be found preferable to confine its transverse deformation to only a portion of its width and, in successive operations, to weld to its edges one flange at a time. The method and apparatus for doing this are illustrated in FIGS. 9 to 15 and described below.

Referring to the latter drawings, there are shown a web 75 and two flanges 76 and 77 aligned in an I-beam configuration. For purposes of the following discussion, it is assumed that flange 77 has already been welded to the web in a previous operation like the one to be described. The flanges and web are advanced into apparatus shown that maintains the desired configuration of the parts while deforming the web. Thus web 75 enters a first stand of opposed, constant diameter, horizontal rolls 80 and 81 that bear on the web sufficiently to support and advance it. Simultaneously, flanges 76 and 77 advance, at the same rate of speed as the web 75, between vertical squeeze rolls 82 and 83 that bear on their external surfaces. Smaller constant diameter rolls 84 and 85 are located against the top and bottom inner surface of flange 76 to help steady and move it. The flanges can also be supported, steadied and powered, if desired, by constant diameter rolls 86 and 87 engaging the top and bottom edges of the flanges (see FIGS. 9 and 10). It will be appreciated that a plurality of roll stands of the type just mentioned may be used, two such stands in succession being shown in FIG. 9.

As web 75 emerges from the second of these roll stands, it passes between opposed rolls 90 and 91 (see FIGS. 9 and 11). The top roll 90 has an end portion 92, on the end remote from flange 76, that is of constant diameter, while the remainder of the roll surface is concave. Bottom roll 91 is a matching roll. It will be noted that rolls 90 and 91 engage only a portion of the width of the web, to wit, the marginal portion adjacent flange 76, and that only part of this portion (the part engaged by the curved roll faces) is deformed. As a result, the web is effectively narrowed on only one side adjacent the flange that is to be welded to the web. The flanges advance along with the web and are guided by vertical rolls 93 and 94.

The web emerging from rolls 90 and 91 is then passed through a series of additional roll stands, three such stands having roll pairs 96 and 97, 98 and 99, and 100 and 101, being shown in the drawings. In these stands, the deforming portions of the rolls have progressively greater curvature and further decrease the effective width of the web on the side to be welded, which becomes spaced progressively farther from its adjacent flange. At the same time, the adjacent flange is guided by vertical guide rolls 104, 106, and 108, while the other flange that is already welded to the web is guided by rolls 105, 107, and 109. The fully deformed web, having the requisite reduction in width, is then passed through a pair of constant diameter rolls 110 and 111, which completely flatten the web and restore it to its original width. At the same time, forging and squeeze rolls 112 and 113 force flange 76 against the adjacent edge of the web. As in the previous embodiment, flattening rolls 110 and 111 tend to flatten the web in advance, so that the spacing of the side edge of the web from adjacent flange 76 progressively decreases from a maximum at about the last set of deforming rolls 100 and 101 to a minimum (zero) at about the flattening rolls. Accordingly, as shown in FIG. 9, a V-opening 114 is defined between the edge of the web and the adjacent flange as those members approach the flattening rolls, with the apex 115 of the V substantially in the plane defined by the axes of those rolls.

A short distance in advance of the flattening rolls 110 and 111 are a first electrical contact 116 engaging the surface of the web adjacent its edge and a second electrical contact 118, in advance of contact 116, engaging the surface of the flange adjacent the side of the V thereon. As previously discussed in connection with FIG. 6, these contacts serve as the terminals for leads from conventional, high frequency welding apparatus (not shown), whereby the surfaces of these members can be heated to welding and forging temperature.

From the foregoing description, it is apparent that the present invention constitutes a unique and highly versatile process, by which large structural members can be fabricated economically and without regard to the width of the web or to the fact that the flanges may be too thick to deform. While the invention has been described with respect to the fabrication of an I-beam, it is equally applicable to the formation of other structural shapes or combinations of metal plates and strip, in which two members are to be welded together by high frequency resistance welding techniques and in which one of those members is to be welded along an edge of a deformable transverse section, such as, for example, a T-section. It should also be understood that other changes can be made without departing from the scope of the invention. For example, the character of the web deformation can be changed from that described, and the web deformed by twisting, angling, multi-curving, or the like, so long as its effective width is first reduced and then restored to provide the desired V-opening between the surfaces to be welded. Still other changes, such as the number and location of the electrical contacts, will occur to those skilled in the art, upon consideration of this specification, claims, and drawings.

What is claimed is:

1. The method of forming a structural shape comprising arranging a web and a flange member into a contiguous configuration, simultaneously advancing those members while maintaining the flange essentially straight, progressively deforming the web in at least part of its transverse section during its advance to narrow its effective width until its edge adjacent the flange becomes spaced from the flange by a predetermined distance, then flattening the advancing previously deformed web to restore it to its original effective width while at the same time forcing the flange into contact with the adjacent edge of the web where the web has been flattened, whereby a V-space is defined between the web and the flange with the apex of the V at the point of flattening of the web and with one side of the V defined by the edge of the web between the point where the web is flattened and a point in advance thereof and with the other side of the V defined by the opposed portion of the surface of the adjacent flange, and heating the surface of those members along the sides of the V by high frequency current to raise the surface temperature sufficiently to result in welding of the members at about the apex of said V.

2. The method according to claim 1, in which the web and flange member are arranged and welded into a T-configuration to form a T-beam, and in which a second flange member is thereafter arranged into a contiguous T-configuration with the free edge of the web of the T-beam and the steps of progressively deforming the web over part of its transverse cross section and of welding the second flange member to the edge of the web are repeated to produce an I-beam.

3. The method of forming a structural shape comprising arranging a web and two flange members into a contiguous I-configuration, simultaneously advancing those three members while maintaining the flanges essentially parallel, progressively deforming the web in at least part of its transverse section during its advance to narrow its effective width until each side edge becomes spaced from its adjacent flange by a predetermined distance, then flattening the advancing previously deformed web to restore it to its original effective width while at the same time squeezing the flanges towards one another into forceful contact with the side edges of the web where the web has been flattened, whereby a V-space is defined between the web and each flange with the apex of the V at the point of flattening of the web and with the edge of the web before the web is flattened defining one side of the V, and heating the members at their surfaces along the sides of each V by high frequency resistance current heating to raise the surface temperature sufficiently to result in welding at about the apex of each V.

4. Apparatus for fabricating a structural shape from a flat web and a flat flange by means of high frequency resistance welding comprising means supporting the two members in a contiguous configuration, means for advancing the members while maintaining the flange essentially straight, means for progressively deforming the web in at least part of its transverse section during its advance to narrow its effective width until its edge adjacent the flange becomes spaced from the flange by a predetermined distance, means for flattening the previously deformed web while it is advancing to restore it to its original width, means for forcing the flange into contact with the adjacent edge of the web where the web has been flattened, thereby creating a V-space between the web and the flange with the apex of the V at the point of flattening of the web and with one side of the V defined by the edge of the web between the point where the web is flattened and a point in advance thereof and with the other side of the V defined by the opposed portion of the surface of the adjacent flange, and means for heating the surface of the members along the sides of the V by high frequency electrical current, thereby to raise the surface temperature sufficiently to permit forge welding of the members at about the apex of the V.

5. Apparatus according to claim 4, in which the means for progressively deforming the web in at least part of its transverse section includes a stand of two-high concave-convex matching rolls that impart a curvature to a transverse portion of the web.

6. Apparatus according to claim 5, in which the rolls are adapted to receive a marginal side portion of the web and in which the rolls have a cylindrical portion for receiving and maintaining flat the middle portion of the web, thereby deforming only said marginal portion of the web.

7. Apparatus for fabricating an I-beam from a flat web member and two flat flange members by means of high frequency resistance welding, comprising: means supporting the two members in a contiguous I-configuration, means for advancing the members while maintaining the flange members essentially straight, means for progressively deforming the web member in at least part of its transverse section during its advance to narrow its effective width until its edges adjacent the flanges becomes spaced from the flanges by a predetermined distance, means for flattening the previously deformed web while it is advancing to restore it to its original width, means for forcing the flanges into contact with the adjacent edges of the web where the web has been flattened thereby creating a V-space between the web and each flange with the apex of the V at the point of flattening of the web and with one side of each V defined by an edge of the web between the point where the web is flattened and a point in advance thereof and with the other side of each V defined by the portion of the surface of the adjacent flange opposite said web edge, and means for heating the surfaces of the members along the sides of each V by high frequency electrical current, thereby to raise the surface temperature sufficiently to weld the flanges to the web at about the apex of each V.

References Cited in the file of this patent

UNITED STATES PATENTS

| | | |
|---|---|---|
| 2,062,875 | Gardner | Dec. 1, 1936 |
| 2,179,803 | Sykes | Nov. 14, 1939 |
| 2,459,625 | Capp | Jan. 18, 1949 |
| 2,821,619 | Rudd | Jan. 28, 1958 |